United States Patent Office 3,004,957
Patented Oct. 17, 1961

3,004,957
PYRIDYL ACRYLATES

John W. Lynn, Charleston, W. Va., assignor to Union Carbide Corporation, a corporation of New York
No Drawing. Filed Mar. 12, 1959, Ser. No. 798,824
13 Claims. (Cl. 260—85.5)

This invention relates to novel pyridyl acrylates, and to the polymers produced therefrom.

The pyridyl acrylates with which this invention is concerned can be represented by the general formula:

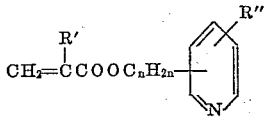

wherein R' represents a hydrogen atom, a hydrocarbyl radical, a halogen atom or a cyano radical; R" has the same meanings as indicated for R'; ($n$) is an integer having a value of from 1 to about 18, preferably ($n$) has a value up to about 8; and the

radical is attached to either the 2 or 4 position of the pyridyl nucleus.

By the term "hydrocarbyl radical" is meant a linear or branched radical containing hydrogen and carbon atoms only, such as a monovalent saturated alkyl radical containing from 1 to about 10 carbon atoms, for example, methyl, ethyl, propyl, isopropyl, butyl, sec.-butyl, hexyl, neopentyl, 2-ethylhexyl, and the like; or a monovalent aryl radical, for example, phenyl, naphthyl, and the like; or a monovalent aralkyl radical, for example, benzyl, phenethyl, and the like; or a monovalent alkaryl radical, for example, tolyl, xylyl, and the like; or a monovalent cycloalkyl radical, for example, cyclopentyl, cyclohexyl, methylcyclohexyl, and the like.

The class of pyridyl acrylates disclosed by this invention has not heretofore been known. These pyridyl acrylates can be prepared by reacting an alkyl acrylate ester with a hydroxyalkylpyridine at the reflux temperature of the mixture, as represented by the following general equation:

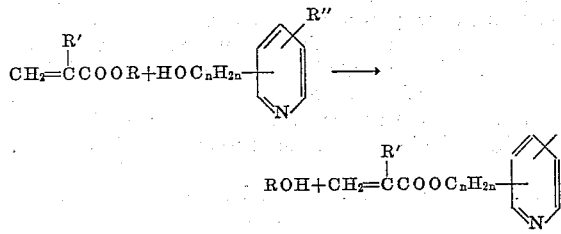

wherein R', R" and ($n$) have the same meanings defined above, and R represents a monovalent saturated lower alkyl radical containing from 1 to about 12 carbon atoms. The reaction is preferably carried out in the presence of a polymerization inhibitor, such as phenyl-beta-naphthylamine, to prevent polymerization of the acrylate ester; and an ester exchange catalyst, such as titanium tetrabutylate, to catalyze the reaction producing the pyridyl acrylates. Further, to speed the reaction an excess of the alkyl acrylate ester starting material is preferred, though it is not necessary nor is the amount of the excess critical.

Illustrative of the starting alkyl acrylate esters which can be used to produce the pyridyl acrylates of this invention, the following can be mentioned:

Methyl acrylate
Ethyl acrylate
Propyl acrylate
Butyl acrylate
Pentyl acrylate
Neopentyl acrylate
2-ethylhexyl acrylate
Methyl methacrylate
Ethyl methacrylate
Propyl methacrylate
Butyl methacrylate
Ethyl chloroacrylate
Pentyl bromoacrylate
Methyl cyanoacrylate
Ethyl cyanoacrylate
Propyl cyanoacrylate
Butyl cyanoacrylate, and the like Among the hydroxyalkylpyridines which can be used as starting materials in this invention there can be mentioned:

2-hydroxymethyl pyridine
4-hydroxymethyl pyridine
2-(2'-hydroxyethyl)pyridine
4-(2'-hydroxyethyl)pyridine
2-(3'-hydroxy-sec-butyl)pyridine
5-methyl-2-(2'-hydroxyethyl)pyridine
5-ethyl-2-(2'-hydroxyethyl)pyridine
5-isopropyl-2-(3'-hydroxypropyl)pyridine
5-isopropyl-2-(2'-hydroxyisopropyl)pyridine
3-ethyl-2-(2'-hydroxyethyl)pyridine
5-ethyl-2-(6'-hydroxy-5'-ethylhexyl)pyridine
5-phenyl-2-(2'-hydroxyethyl)pyridine
5-benzyl-2-(4'-hydroxybutyl)pyridine
3-xylyl-2-(2'-hydroxyethyl)pyridine
5-tolyl-2-(5'-hydroxypentyl)pyridine
5-cyclohexyl-2-(2'-hydroxyethyl)pyridine, and the like Illustrative of the pyridyl acrylate which can be produced by the process of this invention there can be mentioned:

2-(pyrid-2'-yl)ethyl acrylate
2-(pyrid-2'-yl)ethyl methacrylate
2-(pyrid-4'-yl)ethyl acrylate
2-(pyrid-4'-yl)ethyl methacrylate
2-(pyrid-4'-yl)ethyl cyanoacrylate
2-(5'-methylpyrid-2'-yl)ethyl acrylate
Pyrid-2-yl methyl acrylate
Pyrid-2-yl methyl methacrylate
Pyrid-4-yl methyl methacrylate
Pyrid-4-yl methyl acrylate
2-(5'-methylpyrid-2'-yl)ethyl methacrylate
2-(5'-ethylpyrid-2'-yl)ethyl chloroacrylate
2-(5'-ethylpyrid-2'-yl)ethyl cyanoacrylate
2-(5'-ethylpyrid-2'-yl)ethyl methacrylate
2-(5'-ethylpyrid-2'-yl)ethyl acrylate
3-(5'-isopropylpyrid-2'-yl)propyl acrylate
3-(5'-isopropylpyrid-2'-yl)propyl bromoacrylate
3-(5'-pentylpyrid-2'-yl)propyl acrylate
3-(5'-isopropylpyrid-2'-yl)propyl methacrylate
3-(5'-isopropylpyrid-2'-yl)propyl cyanoacrylate
2'-(3'-ethylpyrid-2'-yl)ethyl acrylate
2-(3'-butylpyrid-2'-yl)ethyl methacrylate
2-ethyl-6-(5'-ethylpyrid-2'-yl)hexyl acrylate
2-ethyl-6-(5'-ethylpyrid-2'-yl)hexyl methacrylate
2-ethyl-6-(5'-ethylpyrid-2'-yl)hexyl cyanoacrylate
2-(5'-phenylpyrid-2'-yl)ethyl acrylate
2-(5'-phenylpyrid-2'-yl)ethyl methacrylate
4-(3'-phenylpyrid-2'-yl)butyl acrylate
2-(5'-benzylpyrid-2'-yl)ethyl acrylate
4-(5'-benzylpyrid-2'-yl)butyl methacrylate
2-(5'-phenethylpyrid-2'-yl)ethyl acrylate
2-(5'-benzylpyrid-2'-yl)ethyl cyanoacrylate
2-(5'-tolylpyrid-2'-yl)ethyl acrylate
2-(5'-tolylpyrid-2'-yl)ethyl methacrylate 2-(5'-xylylpyrid-2'-yl)ethyl acrylate
2-(5'-xylylpyrid-2'-yl)ethyl cyanoacrylate
6-(5'-xylylpyrid-2'-yl)hexyl acrylate
2-(5'-cyclohexylpyrid-2'-yl)ethyl acrylate
2-(5'-methylcyclohexylpyrid-2'-yl)ethyl acrylate, and the like The pyridyl acrylates of this invention can be produced by heating a mixture of alkyl acrylate ester and an hydroxyalkyl pyridine at the reflux temperature of the reaction mixture, preferably in the presence of a polymerization inhibitor and an ester exchange catalyst. During the heating the produced alcohol is removed by distillation, leaving the pyridyl acrylate in the reaction flask. The pyridyl acrylate is then recovered by procedures well known to the art, e.g., distillation.

The pyridyl acrylates can be used to produce polymers; the term "polymer" is used in this specification in the generic sense, and includes homopolymers of the pyridyl acrylates, as well as copolymers, terpolymers, etc., of at least one of the pyridyl acrylates of this invention with at least one other polymerizable monomer. Thus, so long as the resin produced contains the polymerized unit

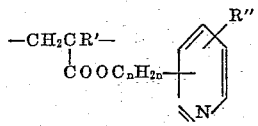

whether alone or interpolymerized with the units of another polymerizable vinyl monomer, the resin obtained is a "polymer." Suitable polymerizable monomers which can be copolymerized with the novel pyridyl acrylates of this invention contain the polymerizable vinyl radical represented by the formula $CH_2=C<$; among these there are included the unsaturated hydrocarbons, e.g., butadiene, isoprene, etc.; acrylyl compounds, e.g., acrylonitrile, methacrylonitrile, methyl acrylate, ethyl acrylate, ethyl methacrylate, ethyl cyanoacrylate, acrylic acid, methacrylic acid, methacrylamide, acrylamide, N-methylacrylamide, N,N-dimethylacrylamide, etc.; vinyl and vinylidine halides, e.g., vinyl chloride, vinyl fluoride, vinylidine chloride, etc.; vinyl carboxylates, e.g., vinyl acetate, vinyl propionate, etc.; and other vinyl compounds such as styrene, vinylidine cyanide, vinyl sulfones, vinyl pyridines, N-vinyl amides, vinyl ethers such as vinyl ethyl ether, and vinyl ketones such as methyl vinyl ketone, etc. The polymers so produced are useful as coating materials, films, molding materials, fibers, and the like.

The pyridyl acrylate polymers are produced by reacting the monomer or mixture of monomers at autogenous pressure at a temperature up to about 100° C. in the presence of a free radical polymerization catalyst. The preferred temperature is from about 40° C. to about 80° C. In producing the polymers of this invention, the amount of pyridyl acrylate present in the polymerizable mixture can be varied from about 1% by weight to 100% by weight. The polymerization can be carried out in bulk; in solution in an inert organic solvent, such as, for example, acetone, toluene, or methyl ethyl ketone, etc., or in an aqueous emulsion or suspension. At the completion of the polymerization reaction the polymer is recovered by conventional means. Suitable free radical catalysts are the peroxides, e.g., acetyl peroxide, benzoyl peroxide, dichloroacetyl peroxide, di-tert.-butyl peroxide, tert.-butyl perbenzoate, chlorobenzoyl peroxide, lauroyl peroxide, tert.-butyl hydroperoxide, and the like; or the azo-type catalysts, e.g., azo-bis-isobutyronitrile, and the like. The catalyst concentration can be varied from about 0.1 part to about 2 parts by weight per 100 parts of monomers charged, the only requirement being that a catalytic amount sufficient to effect polymerization be present.

Among the polymers which can be produced are the homopolymers of the pyridyl acrylates disclosed by this invention as well as the copolymers thereof with other polymerizable monomers. Exemplary of some of the copolymers which can be produced are the copolymers of 2-(5'-ethylpyrid-2'-yl)ethyl acrylate with vinylidine chloride, or with vinyl chloride, or with acrylonitrile, or with methyl acrylate, or with styrene, or with ethyl cyanoacrylate, or with vinyl acetate, or with vinyl ethyl ether; copolymers of 2-(5'-ethylpyrid-2'-yl)ethyl methacrylate with vinylidine chloride, or with styrene, or with butadiene, or with vinyl chloride; the copolymer of 3-(5'-isopropylpyrid-2'-yl)propyl methacrylate with vinyl chloride; the copolymer of 3-(5'-isopropylpyrid-2'-yl)propyl cyanoacrylate with vinyl acetate; terpolymer of 2-(5'-ethylpyrid-2'-yl)-ethyl acrylate with vinylidine chloride and vinyl chloride; and the like.

The following examples further serve to illustrate this invention. Parts are by weight unless otherwise specified.

*Example 1*

A solution of 500 g. of ethyl acrylate, 151 g. of 5-ethyl-2-(2'-hydroxyethyl)pyridine, 1 g. of phenyl-beta-naphthylamine and 13 g. of titanium tetrabutylate was heated for 8 hours at a pot reflux temperature of 76° C. to 88° C. while stirring. During this period an azeotropic mixture of ethanol and ethyl acrylate was slowly removed by distillation. When the reaction was complete, as evidenced by no further formation of ethanol, the mixture was cooled and washed at room temperature with a saturated aqueous solution of sodium citrate and then with water. The washed residue was distilled to remove unreacted ethyl acrylate and the residual oil was then distilled through a falling film evaporator at 110° C. and 0.03 mm. mercury. There was recovered 170 g. of 2-(5'-ethylpyrid-2'-yl)ethyl acrylate having a purity of 96.3% and an $n^{30}/D$ of 1.5036. Calculated for $C_{12}H_{15}NO_2$: C, 70.2%; H, 7.31%; N, 6.83%. Found: C, 70.4%; H, 7.14%; N, 6.99%.

*Example 2*

A mixture of 450 g. of methyl methacrylate, 151 g. of 5-ethyl-2-(2'-hydroxyethyl)pyridine, 0.5 g. of phenyl-beta-naphthylamine and 14 g. of titanium tetrabutylate was heated for 10 hours at a pot reflux temperature of 71° C. to 95° C. while stirring. During this period an azeotropic mixture of methanol and methyl methacrylate having a vapor temperature of 64° C. was slowly removed by distillation. When the reaction was complete, the mixture was cooled and washed at room temperature with a saturated aqueous solution of sodium citrate, and then filtered and washed with water. After drying over sodium sulfate, the solution was distilled at 100° C. and 2 mm. mercury pressure to remove unreacted methyl methacrylate and other volatile materials. The residual 2-(5'-ethylpyrid-2'-yl)ethyl methacrylate was distilled through a falling film evaporator at 109° C. and 0.01 mm. mercury. There was recovered 109 g. of 98.4% pure 2-(5'-ethylpyrid-2'-yl)ethyl methacrylate; $n^{30}/D=1.5023$. Calculated for $C_{13}H_{17}NO_2$: C, 71.2%; H, 7.76%; N, 6.39%. Found: C, 71.1%; H, 7.81%; N, 6.66%.

*Example 3*

A 14 mm. by 12 inches Pyrex polymerization tube, sealed at one end, was charged with 10 grams of 2-(5'-ethylpyrid-2'-yl)ethyl acrylate, and 0.1 gram of azo-bis-isobutyronitrile. The tube was flushed with nitrogen, cooled in Dry Ice and sealed. The sealed tube was rocked at 50° C. in a water bath for 23.3 hours. The poly[2-(5'-ethylpyrid-2'-yl)ethyl acrylate] was removed from the tube after cooling, washed with isopropanol, and dried at 50° C. Yield of solid crosslinked polymer was close to 100%.

*Example 4*

A Pyrex polymerization tube was charged with 10 grams of benzene, 10 grams of 2-(5'-ethylpyrid-2'-yl)ethyl acrylate, and 0.1 gram of azo-bis-isobutyronitrile, and the mixture was polymerized in a manner similar to that described in Example 3. The yield of solid crosslinked poly[2-(5'-ethylpyrid-2'-yl)ethyl acrylate] polymer was close to 100%.

Example 5

A Pyrex polymerization tube was charged with 3 grams of 2-(5'-ethylpyrid-2'-yl)ethyl acrylate, 7 grams of acrylonitrile, and 0.1 gram of azo-bis-isobutyronitrile, and the mixture was polymerized for about 7.5 hours in a manner similar to that described in Example 3. The solid 2-(5'-ethylpyrid-2'-yl)ethyl acrylate/acrylonitrile polymer was washed with isopropanol and dried at 50° C. The dry polymer weighed 2 grams, had a reduced viscosity in dimethylformamide of 0.43 at 30° C., and contained 18.77% nitrogen by analysis.

Example 6

The polymerization of Example 5 was repeated using the same procedure and charge, and a reaction time of 7 hours. The solid, dry 2-(5'-ethylpyrid-2'-yl)ethyl acrylate/acrylonitrile polymer weighed 1.3 grams, had a reduced viscosity of 0.18 at 30° C., and contained 18.93% nitrogen by analysis.

Example 7

A Pyrex polymerization tube was charged with 3 grams of 2-(5'-ethylpyrid-2'-yl)ethyl acrylate, 7 grams of a mixture of chlorostyrenes, and 0.1 gram of azo-bis-isobutyronitrile, and the mixture was polymerized for 7.5 hours in a manner similar to that described in Example 3. The solid 2-(5'-ethylpyrid-2'-yl)ethyl acrylate/chlorostyrene polymer was washed with isopropanol and dried at 50° C. The dry polymer weighed 1.1 grams, had a reduced viscosity in benzene of 0.66 and 30° C., and had a 20.9% chlorine content, indicating an 81.6% chlorostyrene content.

Example 8

The polymerization of Example 7 was repeated using the same procedure and charge, and a reaction time of 7 hours. The solid, dry 2-(5'-ethylpyrid-2'-yl)ethyl acrylate/chlorostyrene polymer weighed 0.65 gram, had a reduced viscosity in benzene of 0.56 at 30° C., and a chlorine content of 20.1%, indicating a 78.6% chlorostyrene content.

Example 9

A polymerization flask was charged with 70 parts of vinylidine chloride, 30 parts of 2-(5'-ethylpyrid-2'-yl) ethyl acrylate and 1 part of azo-bis-isobutyronitrile. The flask was sealed, placed in a constant temperature water bath maintained at 50° C. and mechanically agitated in this bath for 29.5 hours. It was then removed, cooled to room temperature and vented. The polymer was removed and washed with isopropanol. The dried 2-(5'-ethylpyrid-2'-yl)ethyl acrylate/vinylidine chloride polymer weighed 20 grams, and was a brown pliable solid, which had a reduced viscosity in cyclohexanone at 30° C. of 0.5. The polymer analyzed for 37.3% by weight content of 2-(5'-ethylpyrid-2'-yl)ethyl acrylate and 62.7% by weight content of vinylidine chloride.

Example 10

A Pyrex polymerization tube was charged with 10 grams of 2-(5'-ethylpyrid-2'-yl)ethyl methacrylate, and 0.1 gram of azo-bis-isobutyronitrile, and the mixture was polymerized for about 7.5 hours in a manner similar to that described in Example 3. The yield of solid, dry poly[2-(5'-ethylpyrid-2'-yl)ethyl methacrylate] was close to 100%.

Example 11

A Pyrex polymerization tube was charged with 10 grams of benzene, 10 grams of 2-(5'-ethylpyrid-2'-yl) ethyl methacrylate, 0.1 gram of azo-bis-isobutyronitrile, and the mixture was polymerized for 19.75 hours in a manner similar to that described in Example 3. The solid poly[2 - (5' - ethylpyrid - 2' - yl)ethyl methacrylate] was washed with isopropyl ether and dried. The dry polymer weighed 4 grams, and had a reduced viscosity in benzene of 0.225 at 30° C.

Example 12

In a manner similar to that described in Example 9 a mixture of 70 parts of vinylidine chloride and 30 parts of 2-(5'-ethylpyrid-2'-yl)ethyl methacrylate was polymerized in the presence of 1 part of azo-bis-isobutylronitrile as catalyst. The dried polymer weighed 15 grams, and was a reddish brown solid which had a reduced viscosity in cyclohexanone at 30° C. of 0.35. The polymer produced contained 59.6% by weight of 2-(5'-ethylpyrid-2'-yl)ethyl methacrylate and 60.4% by weight of vinylidine chloride.

In a manner similar to that described above, the copolymer of vinyl acetate is produced by substituting vinyl acetate for the vinylidine chloride.

The reduced viscosity $I_R$, which is a measure of the molecular weight of the polymer, may be defined by the equation:

$$I_R = \frac{\frac{\Delta N}{N_0}}{C}$$

wherein $\Delta N$ is the difference between the flow-time of the solution and the flow-time of the solvent, $N_0$ represents the flow-time of the solvent, and C is the concentration of the resin in solution in grams per 100 ml. of solution. Measurements were made at 30° C. using the indicated solvent, and a solution of 0.2 gram of polymer per 100 ml. of solution.

What is claimed is:
1. The compound 2-(5'-ethylpyrid-2'-yl)ethyl acrylate.
2. The compound 2-(5'-ethylpyrid-2'-yl)ethyl methacrylate.
3. The compound 3-(pyrid-2'-yl)propyl cyanoacrylate.
4. The compound 2-(pyrid-2'-yl)ethyl acrylate.
5. The compound 2-(pyrid-2'-yl)ethyl methacrylate.
6. A composition of matter consisting of the homopolymer poly[2-(5'-ethylpyrid-2'-yl)ethyl acrylate].
7. A composition of matter consisting of the homopolymer poly [2-(5'-ethylpyrid-2'-yl)ethyl methacrylate].
8. A composition of matter consisting of the copolymer of 2-(5'-ethylpyrid-2'-yl)ethyl acrylate with vinylidine chloride.
9. A composition of matter consisting of the copolymer of 2-(5'-ethylpyrid-2'-yl)ethyl methacrylate with vinylidine chloride.
10. A composition of matter consisting of the copolymer of 2-(5'-ethylpyrid-2'-yl)ethyl acrylate with acrylonitrile.
11. A composition of matter consisting of the copolymer of 2-(5'-ethylpyrid-2'-yl)ethyl acrylate with chlorostyrene.
12. A novel pyridyl acrylate selected from the group consisting of those of the formulae:

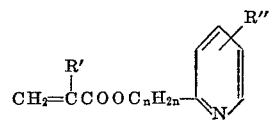

and

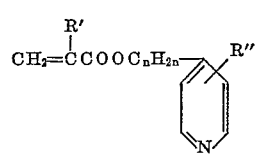

wherein R' and R" are members selected from the group consisting of a hydrogen atom, a monovalent hydrocarbon radical, a halogen atom, and a cyano radical and $n$ is an integer having a value of from 1 to about 18.

13. A polymer of a pyridyl acrylate selected from the group consisting of those of the formulae:

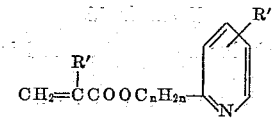

and

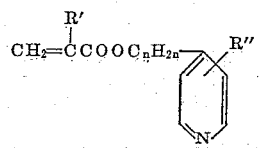

wherein R' and R'' are members selected from the group consisting of a hydrogen atom, a monovalent hydrocarbon radical, a halogen atom, and a cyano radical and $n$ is an integer having a value of from 1 to about 18.

References Cited in the file of this patent

UNITED STATES PATENTS

| | | |
|---|---|---|
| 2,649,438 | Bruson | Aug. 18, 1953 |
| 2,691,641 | Ham et al. | Oct. 12, 1954 |
| 2,882,262 | Smith et al. | Apr. 14, 1959 |

FOREIGN PATENTS

| | | |
|---|---|---|
| 614,772 | Great Britain | Dec. 22, 1948 |